(12) United States Patent
McKibben et al.

(10) Patent No.: US 9,073,414 B2
(45) Date of Patent: Jul. 7, 2015

(54) REMOVABLE BOW END FOR A COVER SYSTEM

(71) Applicant: Aero Industries, Inc., Indianapolis, IN (US)

(72) Inventors: Robert C. McKibben, Lebanon, IN (US); Ryan A. Reeder, Carmel, IN (US)

(73) Assignee: Aero Industries, Inc., Indianapolis, IN (US)

(*) Notice: Subject to any disclaimer, the term of this patent is extended or adjusted under 35 U.S.C. 154(b) by 0 days.

(21) Appl. No.: 14/299,894

(22) Filed: Jun. 9, 2014

(65) Prior Publication Data
US 2014/0361012 A1 Dec. 11, 2014

Related U.S. Application Data (60) Provisional application No. 61/832,916, filed on Jun. 9, 2013.

(51) Int. Cl.
*F16L 3/00* (2006.01)
*B60J 7/06* (2006.01)
*B65D 88/12* (2006.01)

(52) U.S. Cl.
CPC .. *B60J 7/06* (2013.01); *B60J 7/062* (2013.01); *B65D 88/125* (2013.01)

(58) Field of Classification Search
CPC ........................................ F16L 3/127
USPC .............. 220/325, 324, 328, 327, 315, 350; 248/67, 65, 73
See application file for complete search history.

(56) References Cited

U.S. PATENT DOCUMENTS 1,031,835 A * 7/1912 Burnett ........................... 248/67
4,730,800 A * 3/1988 Engman ......................... 248/67
5,316,247 A * 5/1994 Wodka .......................... 248/73

(Continued)

OTHER PUBLICATIONS

Shurco Owner's Manuel Engineered Tarping Solutions for Genuine Shurco Shur-Trak II Premium Cable, End Dumps, Belly Dumps & Dump Bodies, pp. 8-11.

*Primary Examiner* — Steven A. Reynolds
*Assistant Examiner* — King M Chu
(74) *Attorney, Agent, or Firm* — Maginot, Moore & Beck, LLP (57) ABSTRACT

A bow end is provided for a retractable cover assembly for a container, the container having an open top and a side rail extending along each side of the container, and the cover assembly having a tarpaulin sized to cover the open top in an extended position, the cover assembly including a plurality of arcuate bows attached to the cover assembly and configured to support the tarpaulin and to span the width of the container. The bow end is engaged to the each end of each arcuate bow and comprises a one-piece body defining a bow receiving portion with a bore configured to receive an end of the arcuate bow therein, the bow receiving portion including a surface arranged for sliding contact with a top rail when the bow end is engaged to an arcuate bow of the cover assembly. The one-piece body further includes an outboard portion integral with the bow receiving portion and extending substantially vertically downward from the bow receiving portion when the bow end is engaged to an arcuate bow of the cover assembly, the outboard portion extending vertically below the top rail of the container and defining an opening for receiving a drive cable of the cover assembly.

18 Claims, 8 Drawing Sheets

(56) References Cited

U.S. PATENT DOCUMENTS

| | | | |
|---|---|---|---|
| 5,816,543 A * | 10/1998 | Kraus | 248/73 |
| 6,622,976 B1 * | 9/2003 | Ianello | 248/73 |
| 7,780,022 B2 * | 8/2010 | Vermesi et al. | 213/76 |
| 8,403,272 B2 * | 3/2013 | Ohno | 248/73 |
| 2008/0083853 A1 * | 4/2008 | Oh | 248/73 |
| 2008/0210830 A1 * | 9/2008 | Sedivy et al. | 248/73 |
| 2011/0062293 A1 * | 3/2011 | McCoy | 248/73 |
| 2011/0253190 A1 * | 10/2011 | Farnham, Jr. | 136/244 |

* cited by examiner

REMOVABLE BOW END FOR A COVER SYSTEM

REFERENCE TO RELATED APPLICATION

This application is a non-provisional filing of and claims priority to provisional application No. 61/832,916, filed on Jun. 9, 2013, the entire disclosure of which is incorporated herein by reference.

BACKGROUND

The present disclosure relates to slidable cover systems for covering a container, truck body or container, and more particularly to a bow end for such systems.

Figure 1:
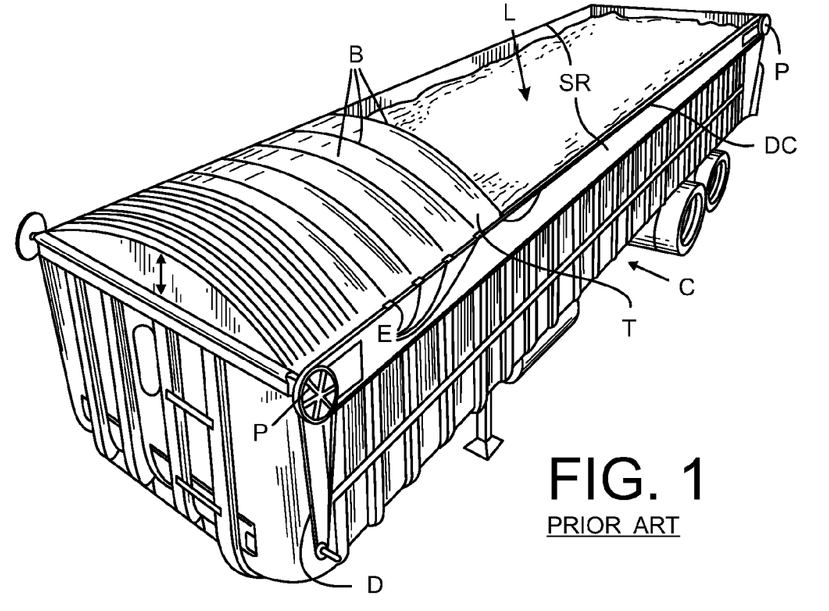
FIG. 1 is a perspective view of a container with a sliding cover system of the prior art.

Slidable cover systems are used to cover the open top of a container body and then slide to one end of the body to permit access to the load within the container body. Thus, a container body C may be in the form of a trailer for carrying a load L, as shown in FIG. 1, a dump truck body or a non-mobile container. The container body includes a cover or tarpaulin T supported by bows B, in which the bows are curved to provide clearance for the load L, particularly a heaped load. The bows B include a bow end structure E at the opposite ends of the bows that are configured to slide along opposite side rails SR of the container C. The bow end structure, or bow ends, E are configured to engage a drive system D, which includes a drive cable DC, as best shown in FIG. 2.

Figure 3:
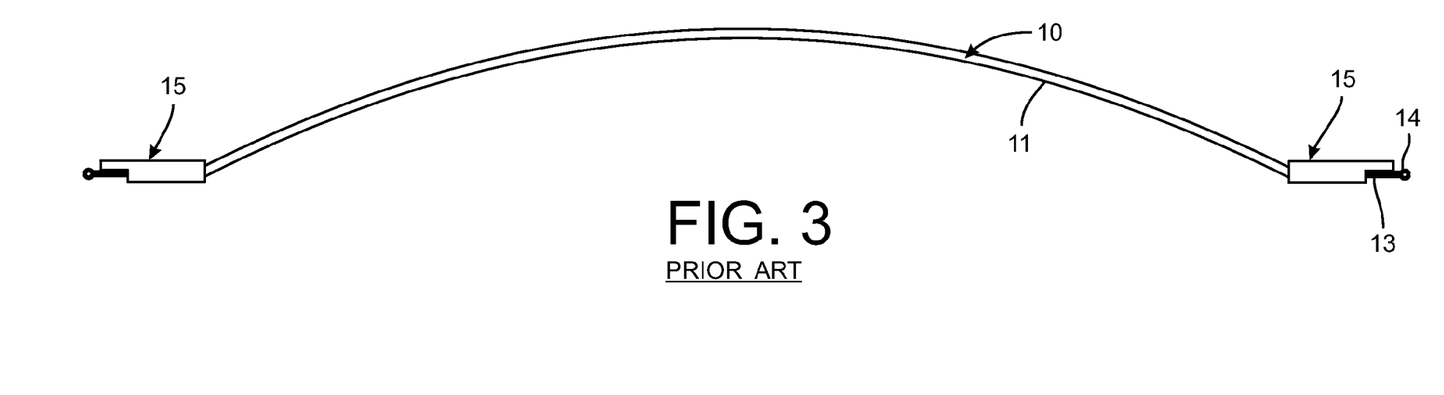
FIG. 3 is a side view of a bow assembly of a prior art sliding cover system.

One example of a prior bow and bow end is shown in FIG. 3. The bow assembly 10 includes a curved bow 11 having straight ends 13 that are configured to ride along the top rail TR of the container C. The ends 13 terminate in a cable gripping element 14 that is configured to be slidably engaged around a drive cable DC. The cable gripping element is typically in the form of clamp halves, with one half integral with the bow end 13 and the other half removable fastened to the bow end half, such as by a bolt. Some bow assemblies include a low friction element 15 disposed around the bow end 13 to facilitate sliding along the top rail.

Figure 2:
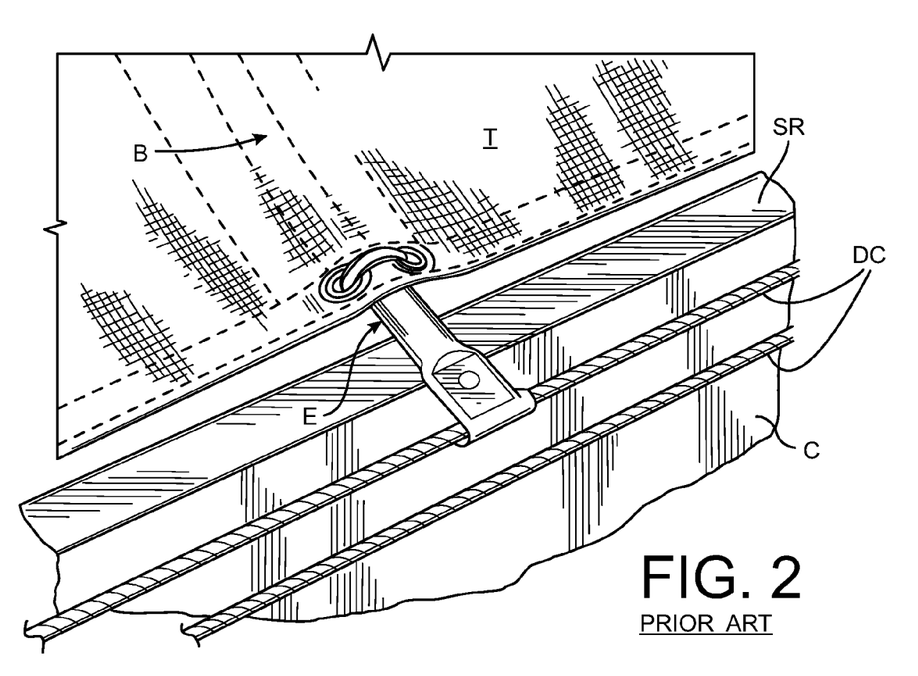
FIG. 2 is a detailed perspective view of a bow end of a prior art sliding cover system.

The prior bow systems, such as the systems shown in FIGS. 1-3, suffer from poor water drainage of the tarp T due to the flat or linear section 13. Moreover, in such prior systems the tarp tends to wear out as it becomes trapped underneath the bow and bow end as it slides. The prior bow systems are also difficult to integrate with a tarp hold-down system that prevents the tarp from billowing upward as the container is transported on the road. Finally, since the bow end 13 is integral with the bow 11 itself, replacing the bow end requires replacing the entire bow, or replacing the bow requires replacing the bow end. Furthermore, the process of replacing either bow or bow end is very cumbersome with these prior bow systems.

SUMMARY

In accordance with one aspect, a bow end is provided for a retractable cover assembly for a container, the container having an open top and a side rail extending along each side of the container, and the cover assembly having a tarpaulin sized to cover the open top in an extended position, the cover assembly including a plurality of arcuate bows attached to the cover assembly and configured to support the tarpaulin and to span the width of the container. The bow end is engaged to the each end of each arcuate bow and comprises a one-piece body defining a bow receiving portion with a bore configured to receive an end of the arcuate bow therein, the bow receiving portion including a surface arranged for sliding contact with a top rail when the bow end is engaged to an arcuate bow of the cover assembly. The one-piece body further includes an outboard portion integral with the bow receiving portion and extending substantially vertically downward from the bow receiving portion when the bow end is engaged to an arcuate bow of the cover assembly, the outboard portion extending vertically below the top rail of the container. The outboard portion defines a drive cable opening for receiving a drive cable of the cover assembly.

The one-piece body includes a stabilizing opening that is configured to receive a tensioning strap or a portion of the drive cable. In one embodiment the stabilizing opening is defined in the bow receiving portion and is configured to receive a tensioning strap that extends across the top rail of the container. In another embodiment the stabilizing opening is defined in the outboard portion vertically below the drive cable opening and configured to loosely receive the lower portion of the drive cable.

DETAILED DESCRIPTION

For the purposes of promoting an understanding of the principles of the invention, reference will now be made to the embodiments illustrated in the drawings and described in the following written specification. It is understood that no limitation to the scope of the invention is thereby intended. It is further understood that the present invention includes any alterations and modifications to the illustrated embodiments and includes further applications of the principles of the invention as would normally occur to one skilled in the art to which this invention pertains.

Figure 4:
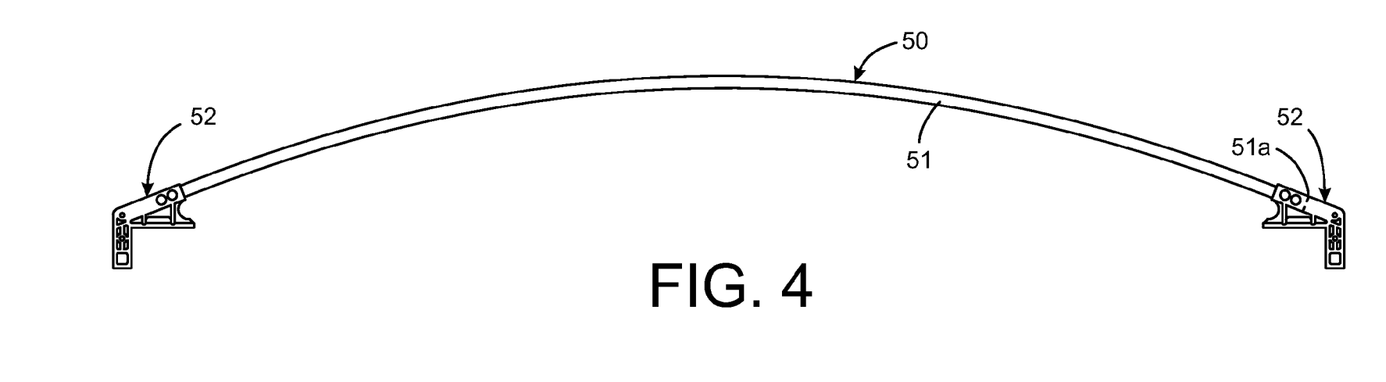
FIG. 4 is a side view of a bow assembly incorporating a bow end according to one aspect of the present disclosure.
Figure 5:
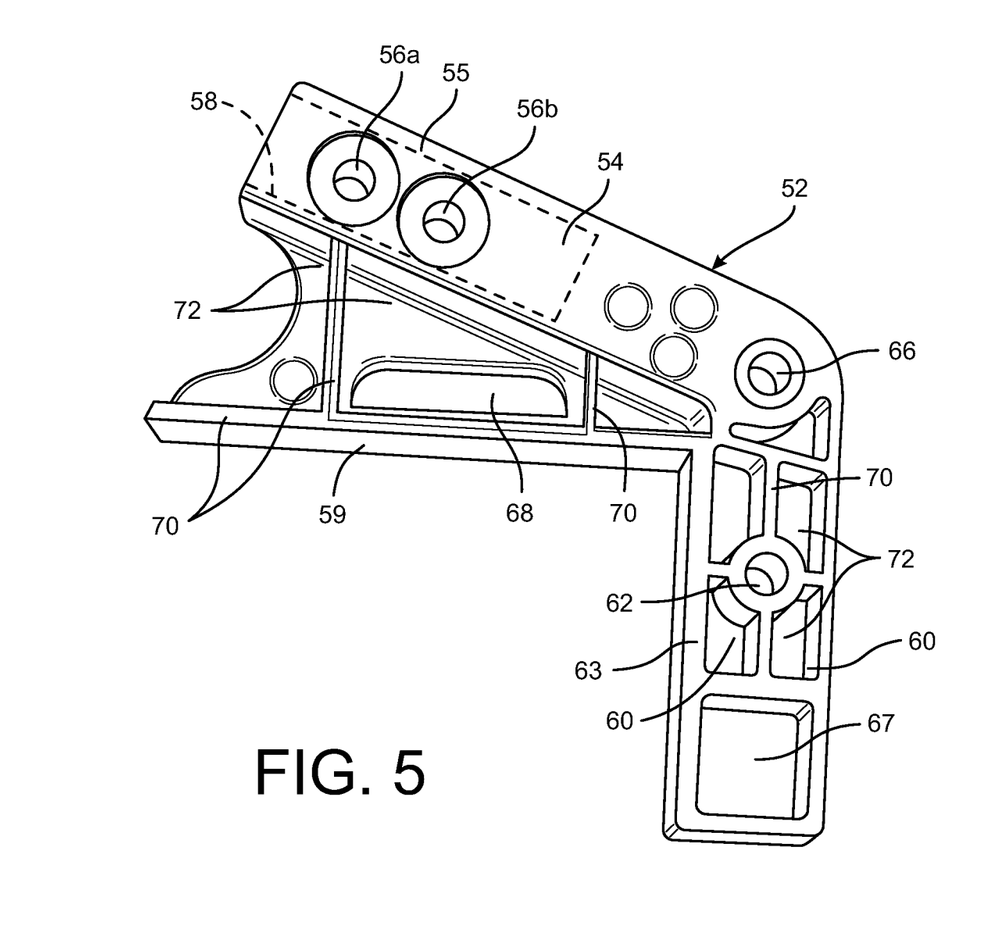
FIG. 5 is a side view of the bow end of the bow assembly shown in FIG. 4.
Figure 6:
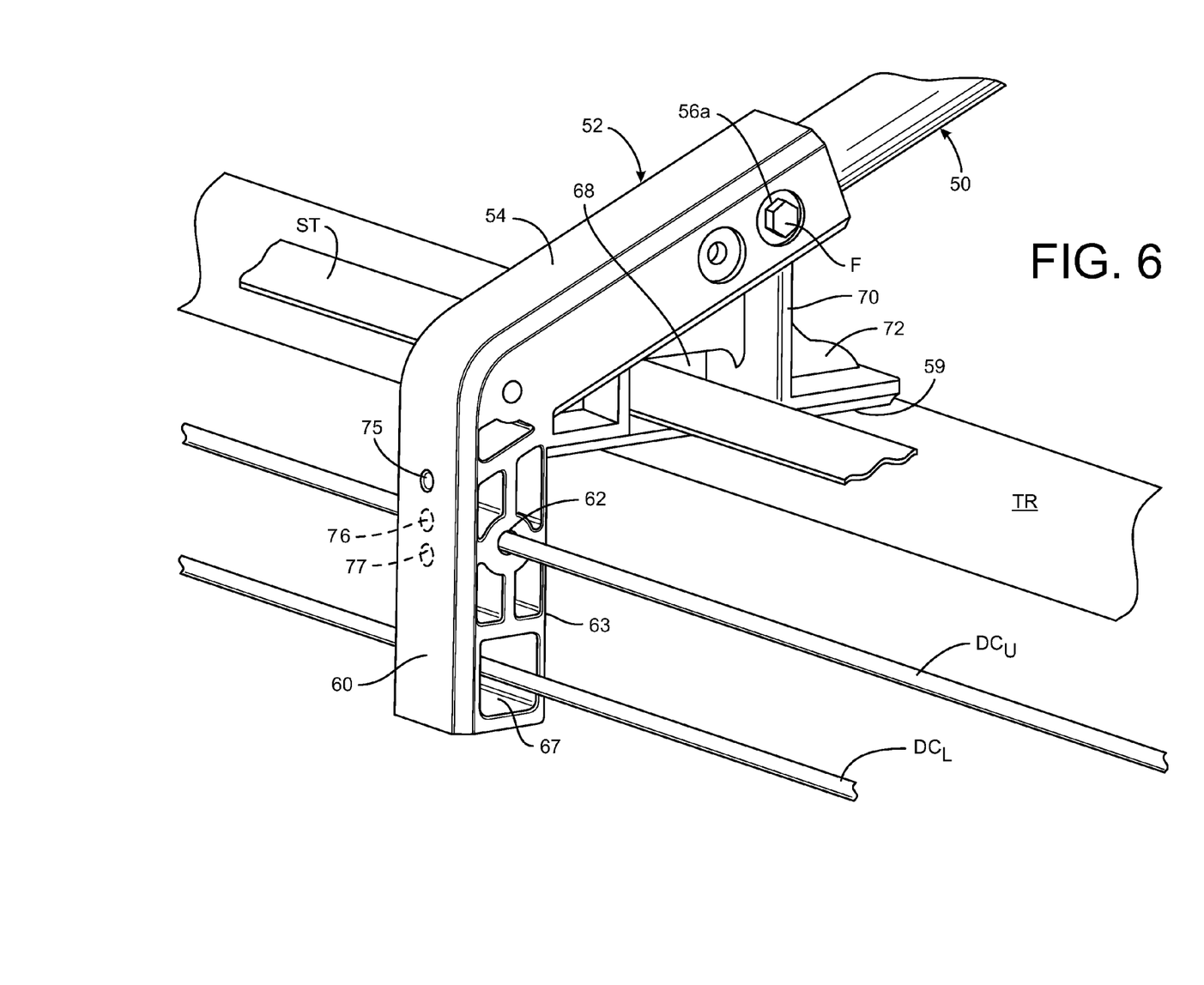
FIG. 6 is an enlarged perspective view of a bow assembly with the bow end use of FIG. 4 depicted in its operative position on the top rail of a container and engaged to the drive cable of the container.

In order to address the deficiencies of the prior bow and bow end systems, a bow assembly 50 is provided with a curved bow 51 terminating at each end in a novel bow end element 52, as shown in FIGS. 4-6. The bow 51 may be configured as a typical bow, meaning that it exhibits a curvature to accommodate the load within the container. However, unlike the bows of the prior bow systems, the bow 51 terminates in a blunt end 51*a*, rather than in the flat or linear end of prior systems (as shown in FIG. 2). As best seen in FIG. 5, the bow end 52 includes a one-piece molded body 54, preferably formed of a high strength plastic material capable of withstanding the load and corrosive environment typically experienced by the container and cover system. The molded body 54 defines a bow receiving portion 55 that includes a bore 58 for receiving the end 51*a* of the bow 51. The bore 58 extends slightly beyond bolt holes 56*a*, 56*b* defined in the bow receiving portion 55. It is contemplated that the bore 58 is complementary with the shape of the bow end 51*a*. The bolt holes 56 receive a standard fastener F (FIG. 6), such as a bolt, that pass through an opening in the bow end 51*a* aligned with one of the bolt holes 56*a*, 56*b*. The bolt holes 56*a*, 56*b* thus provide a quick and easy way to fasten the bow end 52 to a bow, which of course greatly facilitates replacement of the bow and either or both of the bow ends. In one aspect, two bolt holes 56*a*, 56*b* are provided to accommodate an adjustable bow width by selecting which bolt hole is aligned with the corresponding bolt hole in the bow end 51*a*. In other words, for a shorter bow width, the bow end 51*a* can be pushed into the bore 58 for engagement with the innermost bore 56*b*. On the other hand, for a longer bow width the bow end can be aligned with the outermost bore 56*a*. It is further contemplated that for certain cover assemblies it may be desirable to fasten one end of the bow at the opening 56*a* for one bow end and to fasten the opposite end of the bow to the opening 56*b* of the opposite bow end.

The bow receiving portion 55 includes a surface 59 adapted for sliding contact with the upper surface of the top rail TR of the container body, as shown in FIG. 6. The surface 59 is configured for low-friction contact with the top rail, which may be metal or may itself include a low-friction coating. The surface 59 may be generally flat or may convexly curved to provide a line contact with the top rail. In certain embodiments the surface 59 is preferably flat with a width sufficient to provide stability to the bow end 52, such as to prevent fore-aft wobbling of the bow assembly 50 as the cover system is extended or retracted. The surface 59 may be made of the same material as the one-piece body 54, may incorporate a friction-reducing composition, such as embedded graphite particles, or may include a low-friction plate fastened to the body.

The body 54 of the bow end 52 further includes an outboard portion 60 that is generally perpendicular to the surface 59. The body 54 of the bow end 52 is configured so that the bow receiving portion can engages the bow while the outboard portion 60 is disposed immediately outboard of the top rail TR of the container, as shown in FIG. 6. The perpendicular alignment of the outboard portion 60 centers the bow assembly, and thus the cover system, between the side rails of the container—i.e., the outboard portions serve as an "anti-shift" device to keep the cover system from shifting laterally relative to the container. The outboard portion 60 defines an inwardly facing surface 63 that is adapted for sliding contact with the side surface of the top rail TR. The inward surface 63 may thus be configured similar to the surface 59 on the rod receiving portion in that it is configured for low-friction sliding contact with the top rail. The surface 63 may be flat or curved for the same reasons discussed above.

As seen in FIG. 5, the top of the bow-receiving portion 54 is angled relative to the surface 59 and transitions smoothly to the perpendicular outboard portion 60. In particular, the bow receiving portion 54 is at a non-perpendicular obtuse angle relative to the outboard portion. Thus, the bow end 52 does not include any horizontal portion that might collect water, as with prior bow assemblies. In order to reduce material while maintaining adequate strength, the one-piece body of the bow end 52 may constitute a rib and web construction. Thus, as shown in FIG. 5, the body may include vertical and horizontal ribs 70 with thin webs 72 between the ribs. The rib and web construction can be readily incorporated into a molded bow end.

Figure 7:
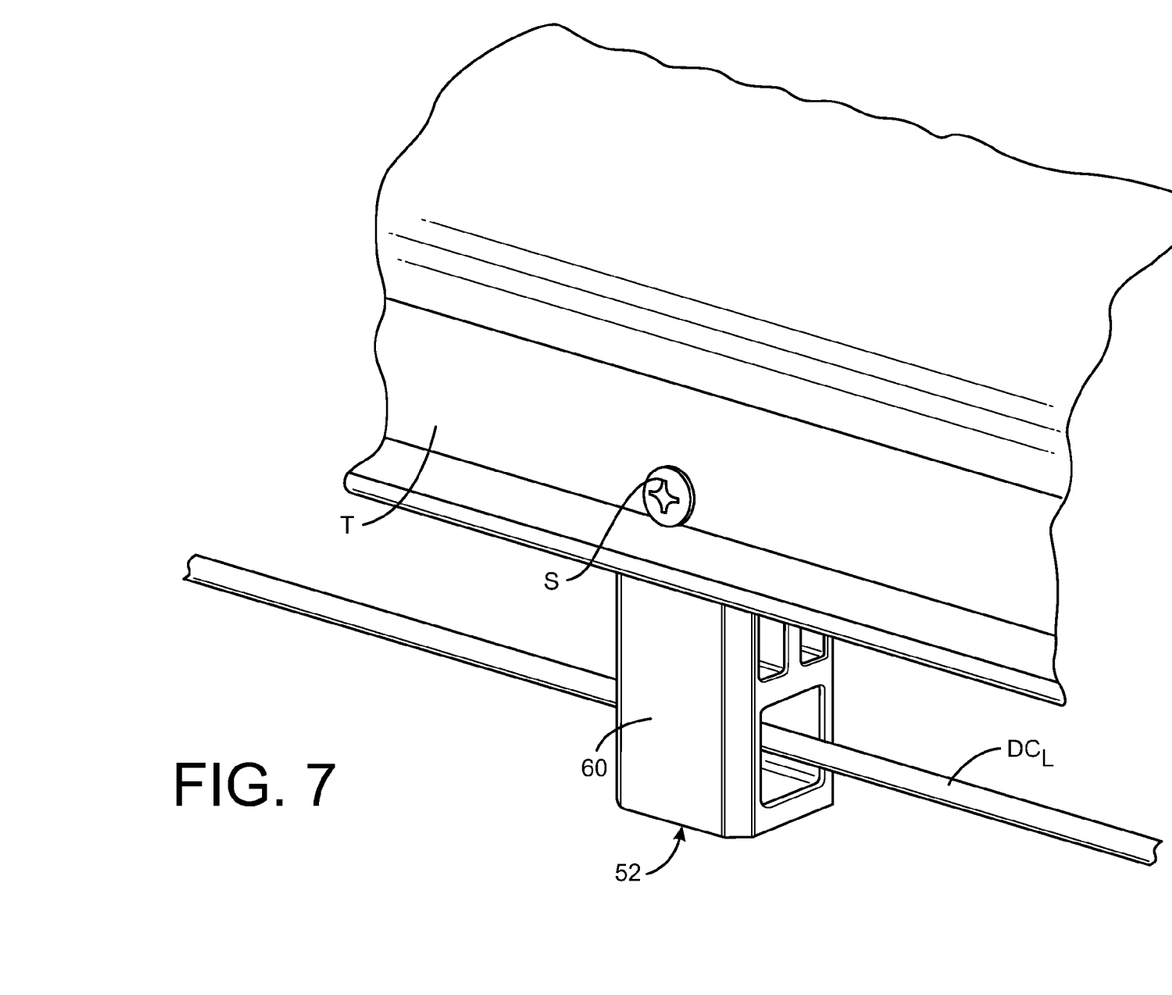
FIG. 7 is an enlarged view of the bow end of FIG. 5 in its operative position with a tarpaulin or flexible cover fastened thereto.
Figure 8:
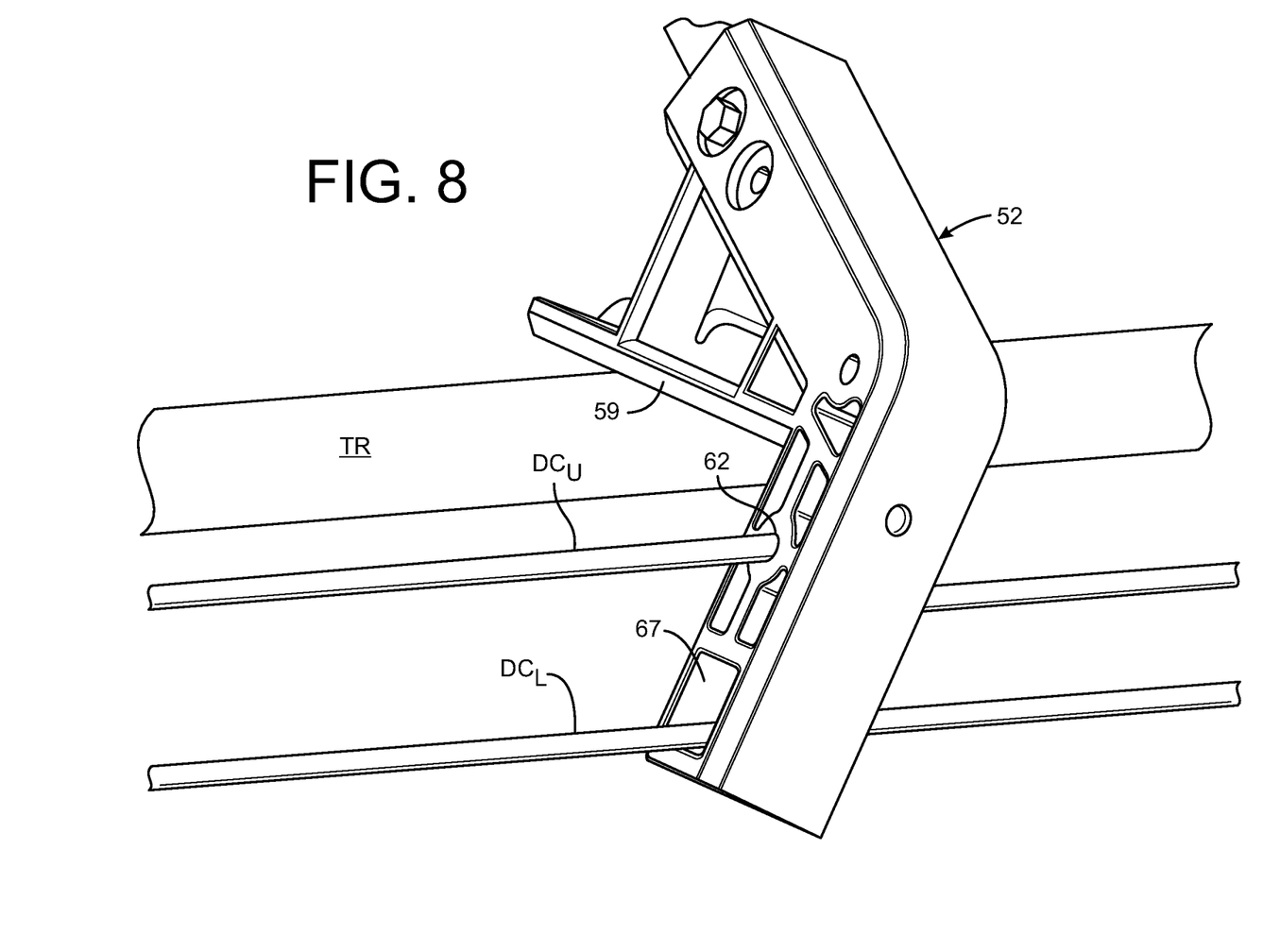
FIG. 8 is an enlarged view of a bow end and bow assembly as shown in FIG. 4 depicted with the bow end pivoted or rotated slightly from its operative position.

In one aspect, the bow end 52 includes a feature for fastening the bow end to the tarpaulin T. In particular, the outboard portion 60 defines a bore 75 configured to receive a fastener, such as a screw S that passes through the tarp T, as shown in FIG. 7. Each bow end is fastened to the tarp in a similar manner. In one embodiment, the bore 75 is above the drive cable or the drive cable upper portion $DC_U$ but close to the vertical plane of the drive cable. Alternatively, a bore 76, shown in phantom in FIG. 6, may be used to fasten the tarp to the bow end directly in the vertical plane of the drive cable. This configuration can reduce tipping or rotation of the bow end (as illustrated in FIG. 8). As a further alternative, a bore 77, shown in phantom in FIG. 6 may be defined in the bow end offset below the drive cable $DC_U$ by the same distance that the bore 75 is offset above the cable. The tarp T would thus be fastened with two screws S, one in the bore 75 and the other in the bore 77 to thereby provide balanced counter forces between the tarp T and bow end, and thus reduce tipping or rotation of the bow end.

The outboard portion 60 defines a bore 62 for receiving a drive cable. In one embodiment, the bow end 52 of the endmost bow in the cover assembly is provided with a device for fixing the bow end to the drive cable DC so that movement of the cable will cause movement of the bow end and consequently the rear bow. The device may be in the form of a friction collet or in a collar and locking nut configuration, as is known in the art. In the embodiment illustrated in FIG. 5, it can be seen that the drive cable must be threaded through the bore 62. Movement of the rear bow causes movement of the intermediate bows either as the tarp is extended to pull the successive bows, or as the rear bow is retracted to push the successive bows by contact.

Figure 12:
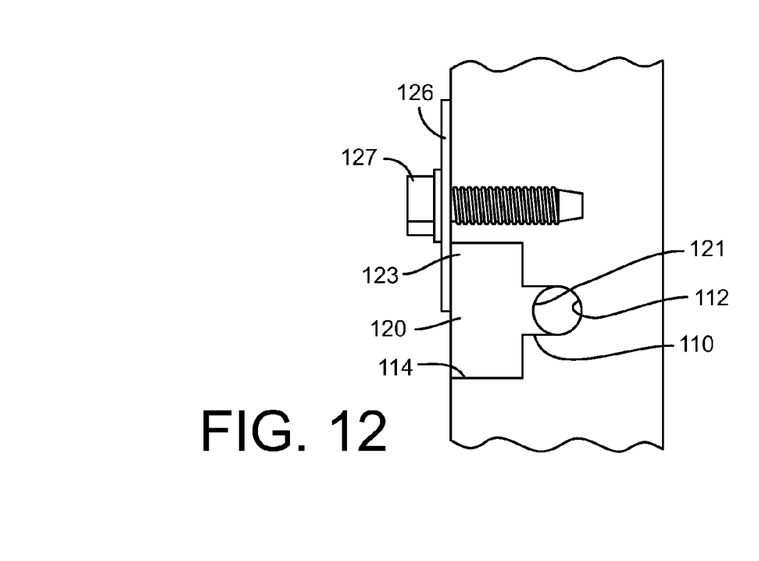
FIG. 12 is an exploded side view of the bow end shown in FIG. 10.

In the embodiment of FIG. 5, the drive cable DC must be threaded through the bores 62 of all the bow assemblies used in the cover system, as depicted in FIG. 6. In an alternative embodiment shown in FIGS. 10-13 a bow end assembly 100 includes a cable retention mechanism 102 that allows the drive cable DC to be introduced into a bow end that has already been installed on a bow. The bow end assembly includes a one-piece body 104 similar to the body 54 in that it includes a bow receiving portion 106 and an outboard portion 108 that define the corresponding surfaces for sliding contact with the top rail of the container body. However, in one modification, rather than the bore 62, the outboard portion 108 defines a side-opening channel 110 that permits introduction of the drive cable from the side of the bow end assembly 100. The channel 110 defines an interior portion 112 (best seen in FIG. 12) that is configured to conform to the drive cable—i.e., the interior portion is circular to match the circular cable. The interior portion 112 opens to a retention opening 114 that is configured for complementary engagement with a retention element 120. The retention element 120 defines an inboard retention surface 121 that is configured to encircle the drive cable between the surface 121 and the interior portion 112 of the channel 110. For the endmost bow assembly, the retention surface 121 may be configured to pinch or clamp the cable between the retention surface 121 and the interior portion 112. For the other bow assemblies, the retention surface 121 may be configured to allow the cable to slide through the opening. The retention surface 121 and interior portion 112 may thus include a low-friction surface, similar to the low friction surface described above in relation to the surface 59 that slides along the top rail TR.

Figure 13:
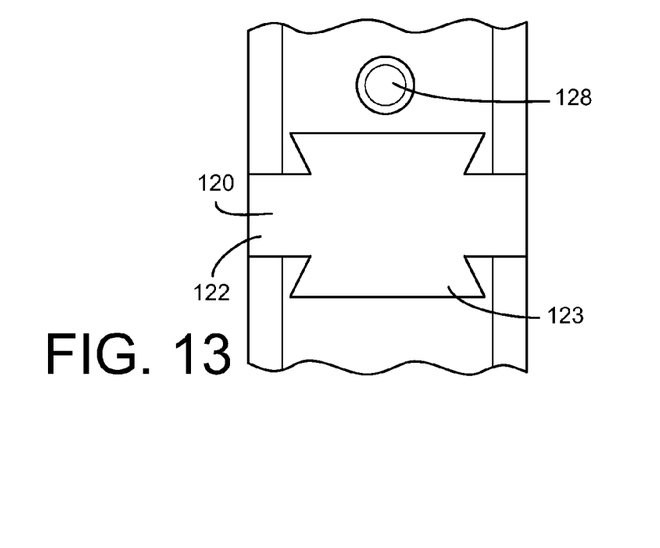
FIG. 13 is an enlarged end view of a portion of the bow end shown in FIG. 10.

As best seen in FIG. 13, the retention element 120 can have a cruciate shape, with side wings 122 and dovetail portions 123. The retention opening 114 thus has a complementary cruciate shape to receive the retention element. The retention element is held within the channel 110 by a locking component 125, which in one embodiment can include a washer 126 and screw 127 configured to be threaded into a bore 128 in the bow end body 104 above or below the side-opening channel 110. The bore 127 may correspond to the bore 75 of the bow end 52 shown in FIG. 6, and the same fastener 127 may be used to fasten the tarp T to the bow end 100, in the manner shown in FIG. 7.

Returning to FIG. 5, the bow end body 54 may define an alignment bore 66 that can be used to align the bow ends for all of the bows in the cover system. In one use, the bow ends 52 are loosely engaged to corresponding bows and the bow ends are compressed in the cover retracted position. A rigid rod can be passed through the alignment bores 66 of the bow ends after which the bows can be fastened to the respective bow end. The bore 66 may also be used to accommodate accessories for use with the cover system.

In a further aspect, the one-piece body 54 includes stabilization or hold-down features. The outboard portion 60 defines a stabilizing cable opening 67 at the base of the portion, as shown in FIGS. 5-6. The opening 67 receives a tensioning cable that is strung under tension from between the front and rear of the container body below the drive cable. This tension cable restricts upward movement of the bow end that might otherwise occur due to wind forces as the container is carried on the road. In one embodiment, the tension cable may be part of the drive cable that is wound around pulleys P at the opposite end of the container, as illustrated in FIG. 1. The drive cable thus includes an upper cable portion $DC_U$ and a lower cable portion $DC_L$, in which the upper cable portion extends through the bore 62 in the bow end. The lower cable portion $DC_L$ passes through the stabilizing opening 67. As illustrated in FIG. 6, the opening 67 is generally square or rectangular, providing significant clearance around the lower drive cable portion $DC_L$.

Figure 9:
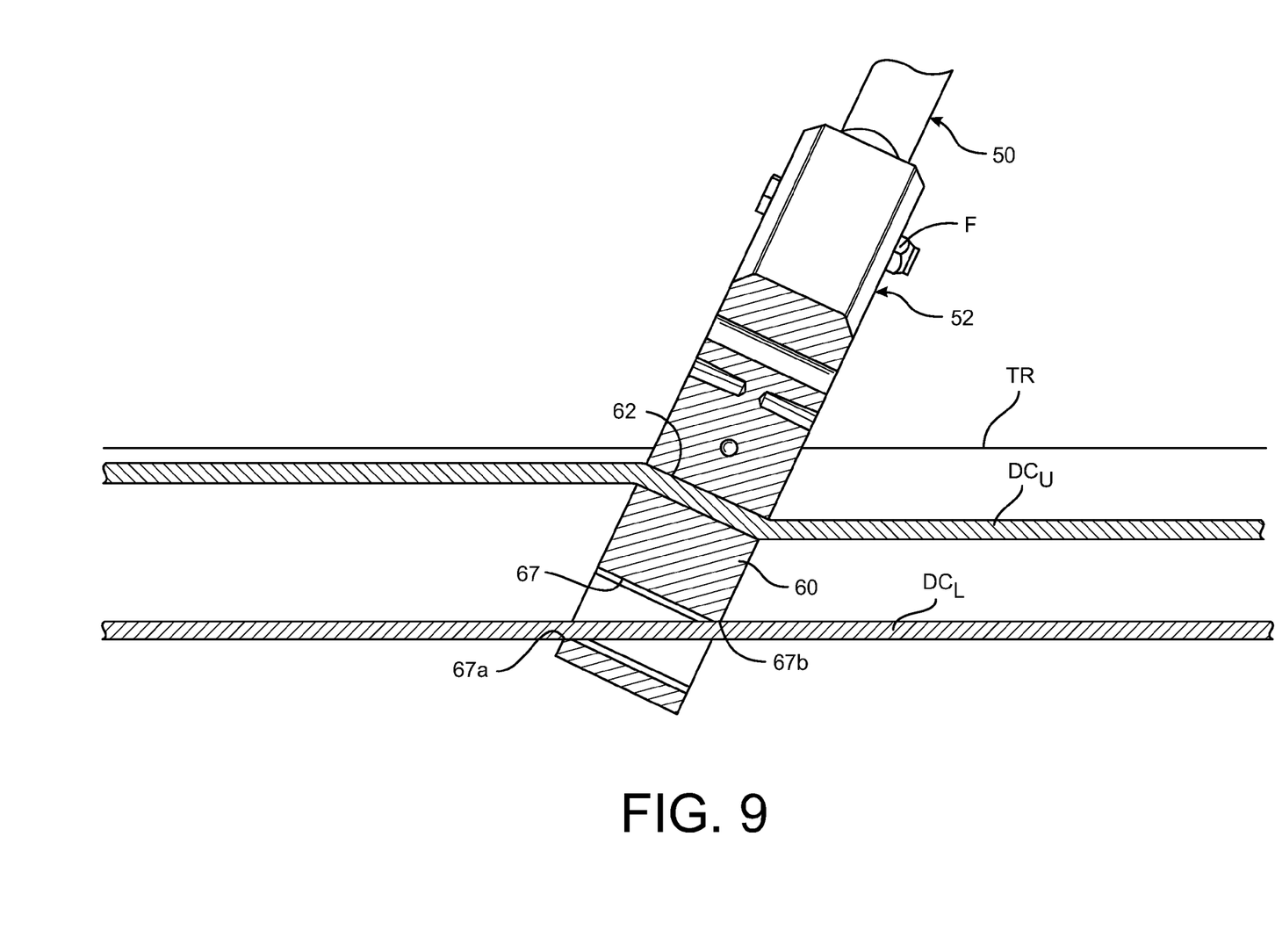
FIG. 9 is a cut-away view of the bow end of FIG. 8.
Figure 10:
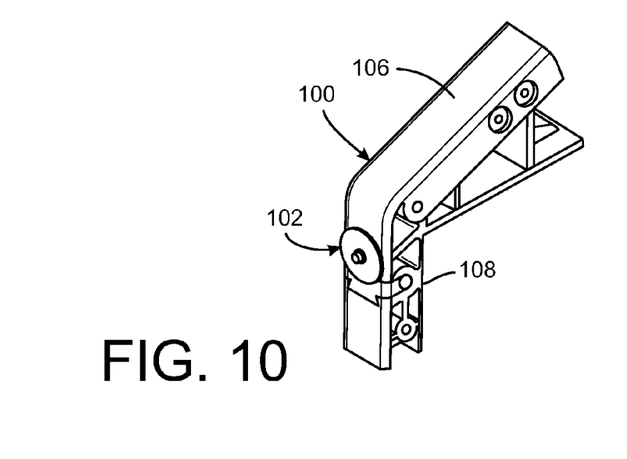
FIG. 10 is a perspective view of a bow end according to a further aspect of the present disclosure.
Figure 11:
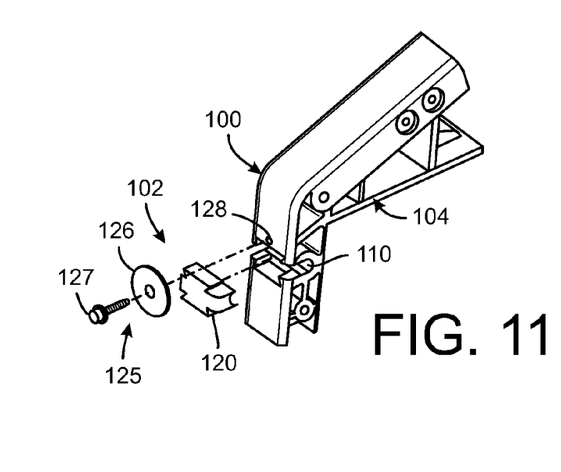
FIG. 11 is an exploded perspective view of the bow end shown in FIG. 106.

The stabilizing opening 67 is configured to limit the amount of pivoting or rotation of the bow end 52 that can occur as the cover system is extended or retracted. It is known that in certain conditions a particular bow assembly can pivot, tilt or rotate relative to the vertical, as depicted in FIGS. 8-9. When a bow assembly tilts it can bind against the top rail TR and jam the cover system, preventing it from deploying or retracting. It has been found that a bow assembly is less likely to bind if the amount of tipping or tilting is limited to less than about 30 degrees. Consequently, the present disclosure contemplates that the opening 67 may be configured so that the lower drive cable portion $DC_L$ contacts the opposite edges 67a, 67b of the opening 67 at a point in which the bow end is tilted at less than about 30 degrees, as depicted in FIG. 9. Thus, as depicted in FIG. 9, even if the bow end 52 is tilted and the upper drive cable portion $DC_U$ is tilted with the bow end, the interaction of the lower cable portion $DC_L$ and the opening 67 prevents the bow end from tilting further, which can create the risk that the bow assemblies will bind during extension and retraction.

In other installations, a tension strap is provided that traverses the top rail of the container. For these installations, the rod receiving portion 55 of the body 54 defines a stabilizing opening 68 for receiving a tension element. The stabilizing opening 68 is elongated generally parallel to the top rail TR and sized to receive a tension strap therethrough, such as tensioning strap ST, as depicted in FIG. 6. The ends of the strap ST may be anchored to the ends of the top rail TR or to a ratchet mechanism at one end to tighten the strap ST after it has been threaded through the opening 68 in all the bow ends 52. The strap not only prevents lifting of the bow end, it also helps prevent the cover or tarp from folding underneath the bow or against the top rail.

While the invention has been illustrated and described in detail in the drawings and foregoing description, the same should be considered as illustrative and not restrictive in character. It is understood that only the preferred embodiments have been presented and that all changes, modifications and further applications that come within the spirit of the invention are desired to be protected.

What is claimed is:

1. A bow end for a retractable cover assembly for a container, the container having an open top and a side rail extending along each side of the container, and the cover assembly having a tarpaulin sized to cover the open top in an extended position, the cover assembly including a plurality of bows configured to support the tarpaulin and to span the width of the container and a drive cable traversing the side of the container, said bow end engaged to the each end of each bow and comprising:
    a one-piece body including a bow receiving portion defining a bore sized and configured to receive an end of the bow therein, the bow receiving portion including a surface arranged for sliding contact with a top rail when the bow end is engaged to a bow of the cover assembly;
    said one-piece body further including an outboard portion integral with the bow receiving portion and extending substantially vertically downward from the bow receiving portion when the bow end is engaged to a bow of the cover assembly, said outboard portion extending vertically below the top rail of the container, said outboard portion defining a drive cable opening sized for receiving the drive cable therethrough in a close running fit; and
    a stabilizing opening defined in said one-piece body separate from said drive cable opening and said bore of said bow receiving portion, said stabilizing opening configured to loosely receive a tension element or a portion of the drive cable therethrough.

2. The bow end of claim 1, in which the bows are arcuate and wherein the bow receiving portion is arranged at a non-perpendicular obtuse angle relative to the outboard portion.

3. The bow end of claim 1, wherein the one-piece body includes a rib and web construction.

4. The bow end of claim 1, wherein the stabilizing opening is defined in said bow receiving portion.

5. The bow end of claim 4, wherein said stabilizing opening is generally elongated parallel to the top rail of the container and configured to receive a tension strap therethrough.

6. The bow end of claim 1, wherein the stabilizing opening is defined in said outboard portion vertically below said drive cable opening.

7. The bow end of claim 6, wherein said stabilizing opening includes opposite edges of said opening configured to engage the tension cable or said portion of the drive cable when said bow end is at a non-vertical orientation in relation to the top rail of the container, whereby the engagement of the tension cable or portion of the drive cable with the opposite edges prevents further movement of the bow end from said non-vertical orientation.

8. The bow end of claim 1, wherein the outboard portion includes a bore for receiving a fastener extending through a portion of the tarpaulin of the cover assembly to fasten the tarpaulin to the bow end.

9. The bow end of claim 8, wherein said bore in said outboard portion is oriented vertically above said drive cable opening.

10. The bow end of claim 8, wherein said bore in said outboard portion is oriented in substantially the same vertical plane as said drive cable opening.

11. The bow end of claim 9, further comprising a second bore oriented vertically below said drive cable opening and configured for receiving a fastener extending through a portion of the tarpaulin of the cover assembly to fasten the tarpaulin to the bow end.

12. The bow end of claim 1, wherein said bow receiving portion includes a pair of bores intersecting said bore and configured for receiving a fastener for engaging the bow to said bow end at different locations on the bow end.

13. The bow end of claim 1, wherein:
said outboard portion defines a retention opening extending from an outboard face of said outboard portion to said drive cable opening, said retention opening configured for passage of the drive cable therethrough to be received in said drive cable opening;
said outboard portion including a retention element configured to be locked within said retention opening to retain the drive cable within said drive cable opening.

14. A retractable cover system for a container, the container having an open top and a side rail extending along each side of the container, the cover assembly comprising:
a tarpaulin sized to cover the open top in an extended position;
a plurality of bows configured to support the tarpaulin and to span the width of the container between the side rails;
a drive cable traversing the side of the container;
a bow end engaged to the each end of each bow and including;
a one-piece body including a bow receiving portion defining a bore sized and configured to receive an end of the bow therein, the bow receiving portion including a surface arranged for sliding contact with a top rail when the bow end is engaged to a bow of the cover assembly;
said one-piece body further including an outboard portion integral with the bow receiving portion and extending substantially vertically downward from the bow receiving portion when the bow end is engaged to a bow of the cover assembly, said outboard portion extending vertically below the top rail of the container, said outboard portion defining a drive cable opening sized for receiving the drive cable therethrough in a close running fit; and
a stabilizing opening defined in said one-piece body separate from said drive cable opening, said stabilizing opening configured to loosely receive a tension element or a portion of the drive cable therethrough.

15. The cover system of claim 14, wherein the stabilizing opening is defined in said bow receiving portion.

16. The cover system of claim 15, further comprising:
a tension strap extending along each top rail of the container; and
said stabilizing opening being generally elongated parallel to the top rail of the container and configured to receive the tension strap therethrough.

17. The cover system of claim 14, wherein:
the drive cable is a continuous cable extending around pulley elements at the ends of the container and includes an upper cable portion and a lower cable portion;
the upper cable portion extending through said drive cable opening; and
said lower cable portion extending through said stabilizing opening, said stabilizing opening being defined in said outboard portion vertically below said drive cable opening.

18. The cover system of claim 17, wherein said stabilizing opening includes opposite edges of said opening configured to engage said lower portion of the drive cable when said bow end is at a non-vertical orientation in relation to the top rail of the container, whereby the engagement of the lower portion of the drive cable with the opposite edges prevents further movement of the bow end from said non-vertical orientation.

* * * * *